US012783383B2

(12) United States Patent
Nichter et al.

(10) Patent No.: US 12,783,383 B2
(45) Date of Patent: Nov. 3, 2026

(54) SOFTWARE PLATFORM HEALTH ANALYSIS

(71) Applicant: Capital One Services, LLC, McLean, VA (US)

(72) Inventors: Thomas D. Nichter, Bumpass, VA (US); Mohamed Seck, Aubrey, TX (US)

(73) Assignee: Capital One Services, LLC, McLean, VA (US)

( * ) Notice: Subject to any disclaimer, the term of this patent is extended or adjusted under 35 U.S.C. 154(b) by 197 days.

(21) Appl. No.: 18/402,479

(22) Filed: Jan. 2, 2024

(65) Prior Publication Data

US 2025/0217262 A1 Jul. 3, 2025

(51) Int. Cl.
*G06F 9/44* (2018.01)
*G06F 11/3604* (2025.01)

(52) U.S. Cl.
CPC ................................ *G06F 11/3604* (2013.01)

(58) Field of Classification Search
CPC .................................................. G06F 11/3604
USPC ........................................................ 717/131
See application file for complete search history.

(56) References Cited

U.S. PATENT DOCUMENTS 10,956,471 B2 * 3/2021 Byron .................. G06F 40/253
11,132,371 B2 * 9/2021 Power ................ G06F 16/9032
11,494,295 B1 * 11/2022 Sirianni ............. G06F 11/3688
11,645,188 B1 * 5/2023 Azad ......................... G06F 8/70 717/126
12,056,002 B2 * 8/2024 Harutyunyan ........ G06F 11/079
12,197,912 B2 * 1/2025 Balasubramanian ..... G06F 8/73
2017/0262360 A1 * 9/2017 Kochura .............. G06F 40/279
2023/0092819 A1 * 3/2023 Karlsson .............. G06F 11/079 706/12

FOREIGN PATENT DOCUMENTS

CN 106875156 A 6/2017
CN 109658061 A 4/2019
GB 2378013 A 1/2003

* cited by examiner

*Primary Examiner* — Evral E Bodden
(74) *Attorney, Agent, or Firm* — Harrity & Harrity, LLP

(57) ABSTRACT

In some implementations, a health system may receive a documentation file associated with a software platform and may apply natural language processing to the documentation file to generate a first health indicator. The health system may receive a set of property indications associated with the software platform and may provide the set of property indications to a clustering model to receive a second health indicator. The health system may receive a log file associated with the software platform and may provide the log file to a machine learning model to receive a third health indicator. The health system may receive a set of notifications associated with failed builds, manual changes, and/or software incidents and may apply rules to the set of notifications to generate a suggested change to the software platform. The health system may output instructions for a user interface that includes the health indicators and the suggested change.

20 Claims, 11 Drawing Sheets

SOFTWARE PLATFORM HEALTH ANALYSIS

BACKGROUND

Software platforms may include cloud applications, cloud storages, monitoring software, and documentation, among other examples. Problems with one aspect may further cause problems in other aspects. For example, outdated or unclear documentation in a platform may lead to security vulnerabilities because an administrator does not update a cloud application in the platform.

SUMMARY

Some implementations described herein relate to a system for analyzing software platform health. The system may include one or more memories and one or more processors communicatively coupled to the one or more memories. The one or more processors may be configured to receive at least one documentation file associated with a software platform. The one or more processors may be configured to apply natural language processing to the at least one documentation file to generate a first health indicator. The one or more processors may be configured to receive a set of property indications associated with the software platform. The one or more processors may be configured to provide the set of property indications to a clustering model to receive a second health indicator. The one or more processors may be configured to receive at least one log file associated with the software platform. The one or more processors may be configured to provide the at least one log file to a machine learning model to receive a third health indicator. The one or more processors may be configured to receive a set of notifications associated with failed builds, manual changes, software incidents, or a combination thereof. The one or more processors may be configured to apply a set of rules to the set of notifications to generate a suggested change to the software platform. The one or more processors may be configured to output instructions for a user interface (UI) that includes the first health indicator, the second health indicator, the third health indicator, and the suggested change.

Some implementations described herein relate to a method of analyzing software platform health. The method may include receiving, at a health system, a set of property indications associated with a software platform. The method may include providing, by the health system, the set of property indications to a clustering model to receive a health indicator. The method may include receiving, at the health system, a set of notifications associated with failed builds, manual changes, software incidents, or a combination thereof. The method may include applying, by the health system, a set of rules to the set of notifications to generate a suggested change to the software platform. The method may include outputting, from the health system, instructions for a UI that includes the health indicator and the suggested change.

Some implementations described herein relate to a non-transitory computer-readable medium that stores a set of instructions for analyzing software platform health. The set of instructions, when executed by one or more processors of a device, may cause the device to receive a set of notifications associated with failed builds, manual changes, software incidents, or a combination thereof, for a software platform. The set of instructions, when executed by one or more processors of the device, may cause the device to generate, using a machine learning model, a suggested change to the software platform based on the set of notifications. The set of instructions, when executed by one or more processors of the device, may cause the device to output instructions for a UI that includes the suggested change. The set of instructions, when executed by one or more processors of the device, may cause the device to determine a possible solution to an incident associated with a notification in the set of notifications. The set of instructions, when executed by one or more processors of the device, may cause the device to transmit an indication of the possible solution using a communication channel selected based on a user preference. The set of instructions, when executed by one or more processors of the device, may cause the device to receive feedback associated with the possible solution. The set of instructions, when executed by one or more processors of the device, may cause the device to update the machine learning model based on the feedback. The set of instructions, when executed by one or more processors of the device, may cause the device to generate, using the updated machine learning model, an additional suggested change to the software platform based on the set of notifications. The set of instructions, when executed by one or more processors of the device, may cause the device to output instructions to update the UI with the additional suggested change.

DETAILED DESCRIPTION

The following detailed description of example implementations refers to the accompanying drawings. The same reference numbers in different drawings may identify the same or similar elements.

Problems in one portion of a software platform can cause trickle-down problems with other portions of the software platform. For example, outdated or unclear documentation in a platform may lead to security vulnerabilities because an administrator does not update a cloud application in the platform. In another example, subpar monitoring systems deployed on a platform may lead to security vulnerabilities because an issue may remain undetected by the subpar monitoring systems.

When problems arise in a software platform, remediation may consume significant power and processing resources. For example, remediation may include reversing code changes, updating software applications, and/or another task that consumes power and processing resources to repair the software platform. Additionally, users of the software platform may suffer latency during downtime of the software platform for remediation.

Some implementations described herein enable a suite of analyses to assess holistic health of a software platform. For example, documentation, monitoring systems, properties, and software applications of the software platform may all be assessed, among other examples. Therefore, problems in one portion of the software platform are proactively detected before causing trickle-down problems with other portions of the software platform. As a result, power and processing resources are conserved that otherwise would have been expended on remediation. Additionally, users of the software platform experienced reduced latency due to reduced downtime of the software platform.

FIGS. 1A-1G are diagrams of an example 100 associated with software platform health analysis. As shown in FIGS. 1A-1G, example 100 includes a software platform controller, a document repository, a log repository, a ticket repository, a health system, a monitoring system, a clustering model and a machine learning (ML) model (e.g., provided by an ML host), and an administrator device. These devices are described in more detail in connection with FIGS. 3 and 4.

Figure 1A:
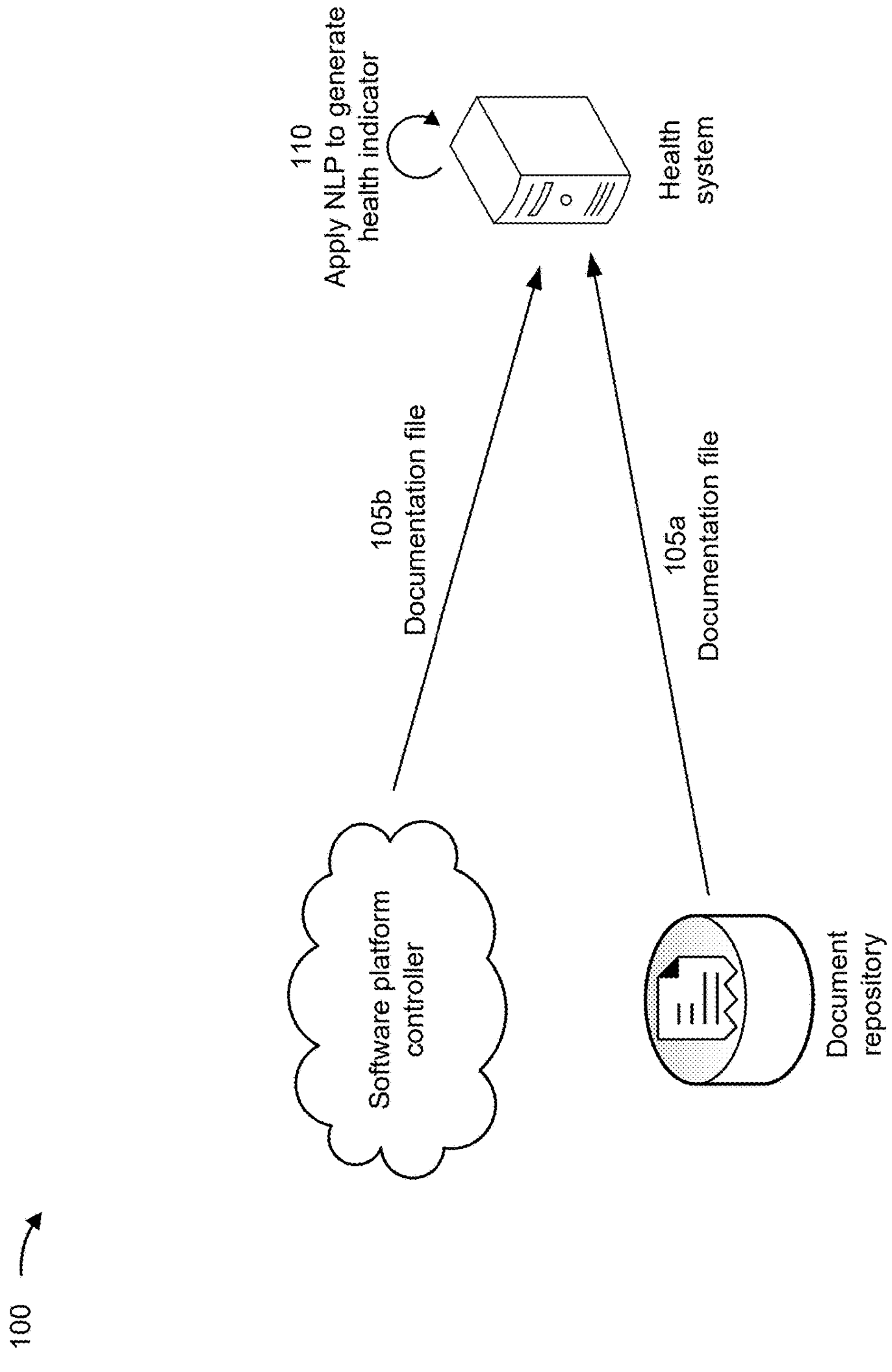
FIGS. 1A-1G are diagrams of an example implementation relating to software platform health analysis, in accordance with some embodiments of the present disclosure.

As shown in FIG. 1A and by reference number 105*a*, the document repository may transmit, and the health system may receive, a documentation file (e.g., at least one documentation file) associated with a software platform. As used herein, "software platform" may refer to an environment in which a software application (or a suite of software applications) is executed and may include hardware in combination with supporting software, such as an operating system (OS), a web browser, associated application programming interfaces (APIs), and/or additional underlying software. The documentation file may include a webpage (e.g., a hypertext markup language (HTML) file, a cascading style sheet (CSS), and/or supporting media, such as images), a portable document format (pdf) file, and/or a word processor file (e.g., a Microsoft® Word file and/or an Apache OpenOffice® file), among other examples.

In some implementations, the health system may transmit, and the document repository may receive, a request for the documentation file. For example, the request may include a hypertext transfer protocol (HTTP) request and/or an API call, among other examples. The request may include (e.g., in a header and/or as an argument) an indication of the documentation file (e.g., at least one indication of at least one documentation file). Accordingly, the document repository may transmit the documentation file in response to the request. The health system may transmit the request according to a schedule (e.g., once per hour or once per day, among other examples) and/or in response to a command to transmit the request. For example, the administrator device (not shown in FIG. 1A) may transmit, and the health system may receive, the command, such that the health system transmits the request in response to the command.

Additionally, or alternatively, the health system may subscribe to documentation updates from the document repository. Accordingly, the document repository may transmit new documentation files (and/or updated documentation files) according to a schedule (e.g., once per hour or once per day, among other examples) and/or as available (e.g., shortly after a new documentation file is added or an existing documentation file is updated).

Additionally, or alternatively, as shown by reference number 105*b*, the software platform controller may transmit, and the health system may receive, the documentation file (e.g., at least one documentation file) associated with the software platform. In some implementations, the health system may transmit, and the software platform controller may receive, a request for the documentation file. For example, the request may include an HTTP request and/or an API call, among other examples. The request may include (e.g., in a header and/or as an argument) an indication of the documentation file (e.g., at least one indication of at least one documentation file). Accordingly, the software platform controller may transmit the documentation file in response to the request. The health system may transmit the request according to a schedule (e.g., once per hour or once per day, among other examples) and/or in response to a command to transmit the request. For example, the administrator device (not shown in FIG. 1A) may transmit, and the health system may receive, the command, such that the health system transmits the request in response to the command.

Additionally, or alternatively, the health system may subscribe to documentation updates from the software platform controller. Accordingly, the software platform controller may transmit new documentation files (and/or updated documentation files) according to a schedule (e.g., once per hour or once per day, among other examples) and/or as available (e.g., shortly after a new documentation file is added or an existing documentation file is updated).

As shown by reference number 110, the health system may apply natural language processing (NLP) to the documentation file to generate a first health indicator. For example, the health system may apply NLP to determine a score (whether qualitative and/or quantitative) associated with the documentation file (e.g., a score reflecting readability or understandability). In some implementations, the NLP includes a machine learning model trained using documentation associated with software platforms that are labeled as well-established. For example, the NLP may be performed on an ML host (e.g., similarly as described for the clustering model in connection with FIG. 1B and the ML model in connection with FIG. 1C). The first health indicator may include a score (whether qualitative and/or quantitative) output in a user interface (UI) (e.g., as described in connection with FIG. 2).

Figure 1B:
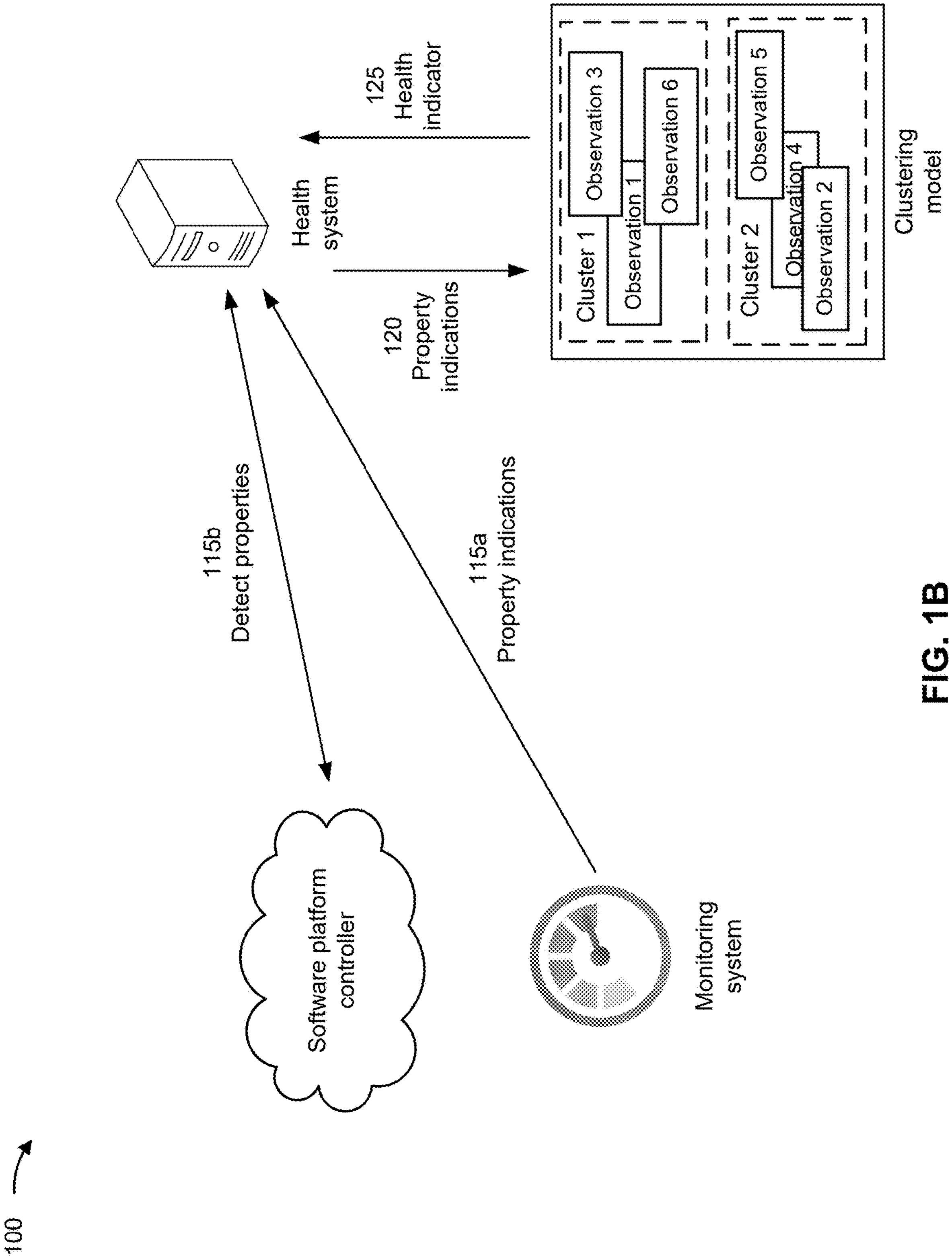

As shown in FIG. 1B and by reference number 115*a*, the monitoring system may transmit, and the health system may receive, a set of property indications associated with the software platform. The set of property indications may include version numbers (and/or build numbers) associated with software applications (whether executed on the software platform or executed as underlying software for the software platforms), firewall settings associated with the software platform (e.g., blacklist Internet protocol (IP) addresses and/or whitelist IP addresses, among other examples), API settings associated with the software platform (e.g., required credentials for API access and/or throttling thresholds for API functions, among other examples), and/or security groups associated with the software platform (e.g., sets of permissions as assigned to various users of the software platform), among other examples.

In some implementations, the health system may transmit, and the monitoring system may receive, a request for the set of property indications. For example, the request may include an HTTP request and/or an API call, among other examples. The request may include (e.g., in a header and/or as an argument) an indication of which properties are being requested (e.g., a set of indications corresponding to a set of properties). Accordingly, the monitoring system may transmit the set of property indications in response to the request. The health system may transmit the request according to a schedule (e.g., once per hour or once per day, among other examples) and/or in response to a command to transmit the request. For example, the administrator device (not shown in FIG. 1B) may transmit, and the health system may receive, the command, such that the health system transmits the request in response to the command.

Additionally, or alternatively, the health system may subscribe to property updates from the monitoring system. Accordingly, the monitoring system may transmit the set of property indications according to a schedule (e.g., once per hour or once per day, among other examples) and/or as available (e.g., shortly after a new property is determined or an existing property is updated).

Additionally, or alternatively, as shown by reference number 115*b*, the health system may communicate with the software platform controller to detect the set of property indications. In some implementations, the health system may transmit, and the software platform controller may receive, a set of queries corresponding to a set of properties that are being requested. Accordingly, the software platform controller may transmit the set of property indications in response to the set of queries. The health system may transmit the set of queries according to a schedule (e.g., once per hour or once per day, among other examples) and/or in response to a command to transmit the set of queries. For example, the administrator device (not shown in FIG. 1B) may transmit, and the health system may receive, the command, such that the health system transmits the set of queries in response to the command.

Additionally, or alternatively, the health system may subscribe to property updates from the software platform controller. Accordingly, the software platform controller may transmit the set of property indications according to a schedule (e.g., once per hour or once per day, among other examples) and/or as available (e.g., shortly after a new property is set or an existing property is updated).

As shown by reference number 120, the health system may provide the set of property indications to a clustering model. For example, the health system may transmit, and the ML host may receive, a request including the set of property indications. The clustering model may be trained (e.g., by the ML host and/or a device at least partially separate from the ML host) using property indications associated with software platforms labeled as well-established (e.g., for supervised learning). Additionally, or alternatively, the clustering model may be trained using an unlabeled set of property indications (e.g., for deep learning). Accordingly, the clustering model may be configured to cluster the set of property indications. Based on which property indications are in a same cluster as property indications associated with well-managed software platforms and which property indications are in different clusters, the clustering model may determine which property indications, in the set of property indications, ought to be changed.

In some implementations, the clustering model may include a regression algorithm (e.g., linear regression or logistic regression), which may include a regularized regression algorithm (e.g., Lasso regression, Ridge regression, or Elastic-Net regression). Additionally, or alternatively, the clustering model may include a decision tree algorithm, which may include a tree ensemble algorithm (e.g., generated using bagging and/or boosting), a random forest algorithm, or a boosted trees algorithm. A model parameter may include an attribute of a model that is learned from data input into the model (e.g., property indications associated with software platforms labeled as well-established). For example, for a regression algorithm, a model parameter may include a regression coefficient (e.g., a weight). For a decision tree algorithm, a model parameter may include a decision tree split location, as an example.

Additionally, the ML host (and/or a device at least partially separate from the ML host) may use one or more hyperparameter sets to tune the clustering model. A hyperparameter may include a structural parameter that controls execution of a machine learning algorithm by the cloud management device, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the model. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

Other examples may use different types of models, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

As shown by reference number 125, the health system may receive a second health indicator from the clustering model. The second health indicator may include a score (whether qualitative and/or quantitative) output in a UI (e.g., as described in connection with FIG. 2) and may be proportional to how many property indications, in the set of property indications, are clustered with property indications from other well-managed platforms (e.g., by the clustering model).

Figure 1C:
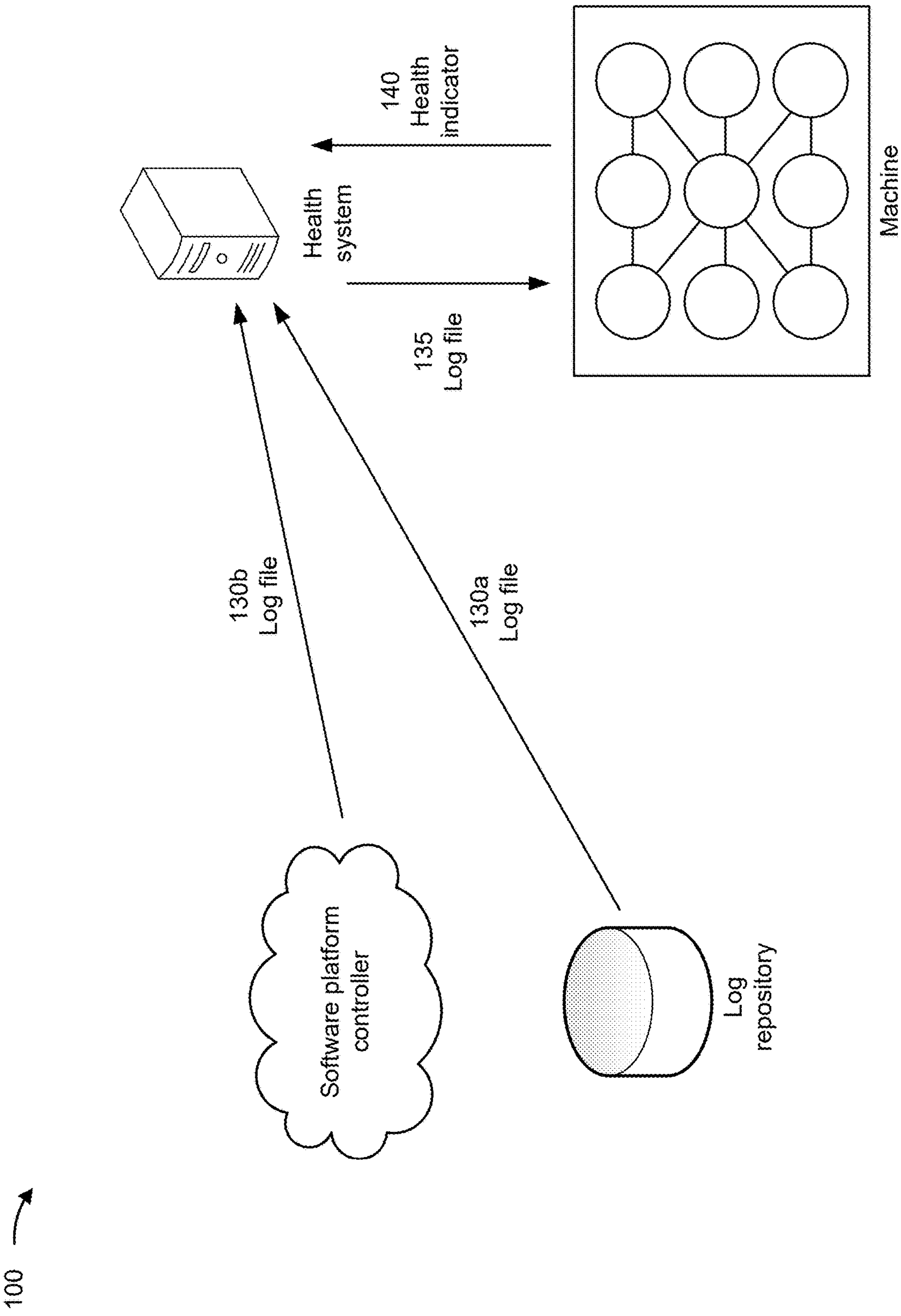

As shown in FIG. 1C and by reference number 130*a*, the log repository may transmit, and the health system may receive, a log file (e.g., at least one log file) associated with the software platform. The log file may include unstructured data (e.g., text files) and/or structured data (e.g., comma separated values (CSVs), tabular data, and/or another type of structured data) output by the monitoring system.

In some implementations, the health system may transmit, and the log repository may receive, a request for the log file. For example, the request may include an HTTP request and/or an API call, among other examples. The request may include (e.g., in a header and/or as an argument) an indication of the log file (e.g., at least one indication of at least one log file). Accordingly, the log repository may transmit the log file in response to the request. The health system may transmit the request according to a schedule (e.g., once per hour or once per day, among other examples) and/or in response to a command to transmit the request. For example, the administrator device (not shown in FIG. 1C) may transmit, and the health system may receive, the command, such that the health system transmits the request in response to the command.

Additionally, or alternatively, the health system may subscribe to log updates from the log repository. Accordingly, the log repository may transmit new log files (and/or updated log files) according to a schedule (e.g., once per hour or once per day, among other examples) and/or as available (e.g., shortly after a new log file is added or an existing log file is updated).

Additionally, or alternatively, as shown by reference number 130*b*, the software platform controller may transmit, and the health system may receive, the log file (e.g., at least one log file) associated with the software platform. In some implementations, the health system may transmit, and the software platform controller may receive, a request for the log file. For example, the request may include an HTTP request and/or an API call, among other examples. The request may include (e.g., in a header and/or as an argument) an indication of the log file (e.g., at least one indication of at least one log file). Accordingly, the software platform controller may transmit the log file in response to the request. The health system may transmit the request according to a schedule (e.g., once per hour or once per day, among other examples) and/or in response to a command to transmit the request. For example, the administrator device (not shown in FIG. 1C) may transmit, and the health system may receive, the command, such that the health system transmits the request in response to the command.

Additionally, or alternatively, the health system may subscribe to log updates from the software platform controller. Accordingly, the software platform controller may transmit new log files (and/or updated log files) according to a schedule (e.g., once per hour or once per day, among other examples) and/or as available (e.g., shortly after a new log file is created or an existing log file is updated).

As shown by reference number 135, the health system may provide the log file to an ML model. For example, the health system may transmit, and the ML host may receive, a request including the log file. The ML model may be trained (e.g., by the ML host and/or a device at least partially separate from the ML host) using monitoring setups associated with software platforms labeled as well-established (e.g., for supervised learning). Additionally, or alternatively, the ML model may be trained using an unlabeled set of monitoring setups (e.g., for deep learning). Accordingly, the ML model may be configured to compare a monitoring setup associated with the log file to monitoring setups of other software platforms. Accordingly, the ML model may determine whether any monitoring software deployed for the software platform ought to be discontinued and/or whether any monitoring software currently unused ought to be deployed.

In some implementations, the ML model may include a regression algorithm (e.g., linear regression or logistic regression), which may include a regularized regression algorithm (e.g., Lasso regression, Ridge regression, or Elastic-Net regression). Additionally, or alternatively, the ML model may include a decision tree algorithm, which may include a tree ensemble algorithm (e.g., generated using bagging and/or boosting), a random forest algorithm, or a boosted trees algorithm. A model parameter may include an attribute of a model that is learned from data input into the model (e.g., monitoring setups associated with software platforms labeled as well-established). For example, for a regression algorithm, a model parameter may include a regression coefficient (e.g., a weight). For a decision tree algorithm, a model parameter may include a decision tree split location, as an example.

Additionally, the ML host (and/or a device at least partially separate from the ML host) may use one or more hyperparameter sets to tune the ML model. A hyperparameter may include a structural parameter that controls execution of a machine learning algorithm by the cloud management device, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the model. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

Other examples may use different types of models, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

The ML model may be the same model (or at least included in a same model ensemble) as the clustering model. Alternatively, the ML model may be separate from the clustering model. For example, the ML host may generate synthetic monitoring setups using a generative adversarial network (GAN) and may train the ML model using the synthetic monitoring setups. In some implementations, a same ML host may provide the ML model as provides the clustering model. Alternatively, the ML model may be provided by a different ML host as the clustering model.

As shown by reference number 140, the health system may receive a third health indicator from the ML model. The third health indicator may include a score (whether qualitative and/or quantitative) output in a UI (e.g., as described in connection with FIG. 2) and may reflect how many monitoring changes are recommended by the ML model (e.g., based on other well-managed platforms and/or synthetic monitoring setups).

Figure 2:
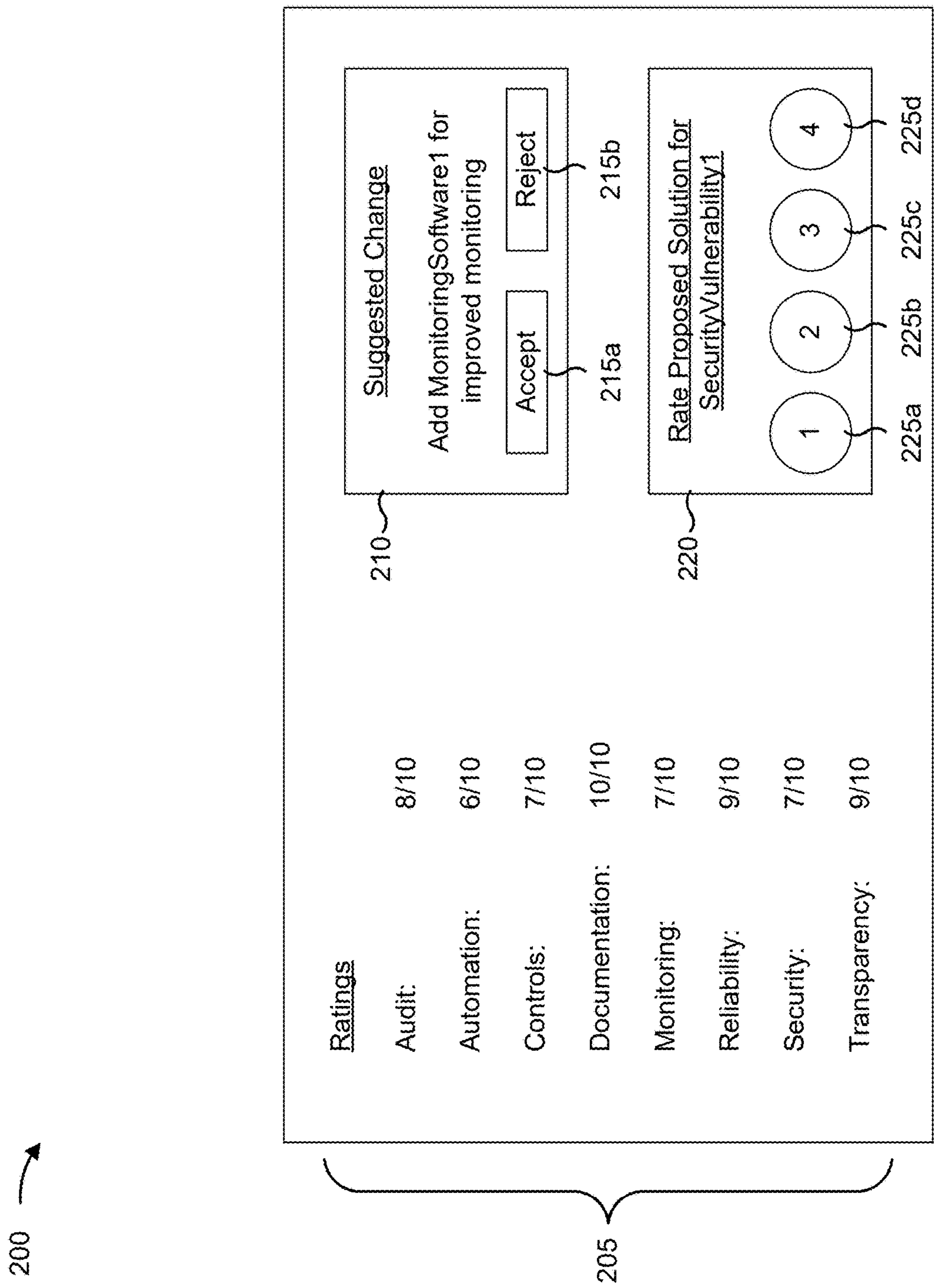
FIG. 2 is a diagram of an example user interface associated with health of a software platform, in accordance with some embodiments of the present disclosure.

Accordingly, the first, second, and third health indicators may include a plurality of ratings corresponding to a plurality of categories (e.g., as shown in FIG. 2). Although the example 100 is described in connection with different health indicators, other examples may include a single machine learning model (or a single model ensemble) that generates a single health indicator including the plurality of ratings corresponding to the plurality of categories.

Figure 1D:
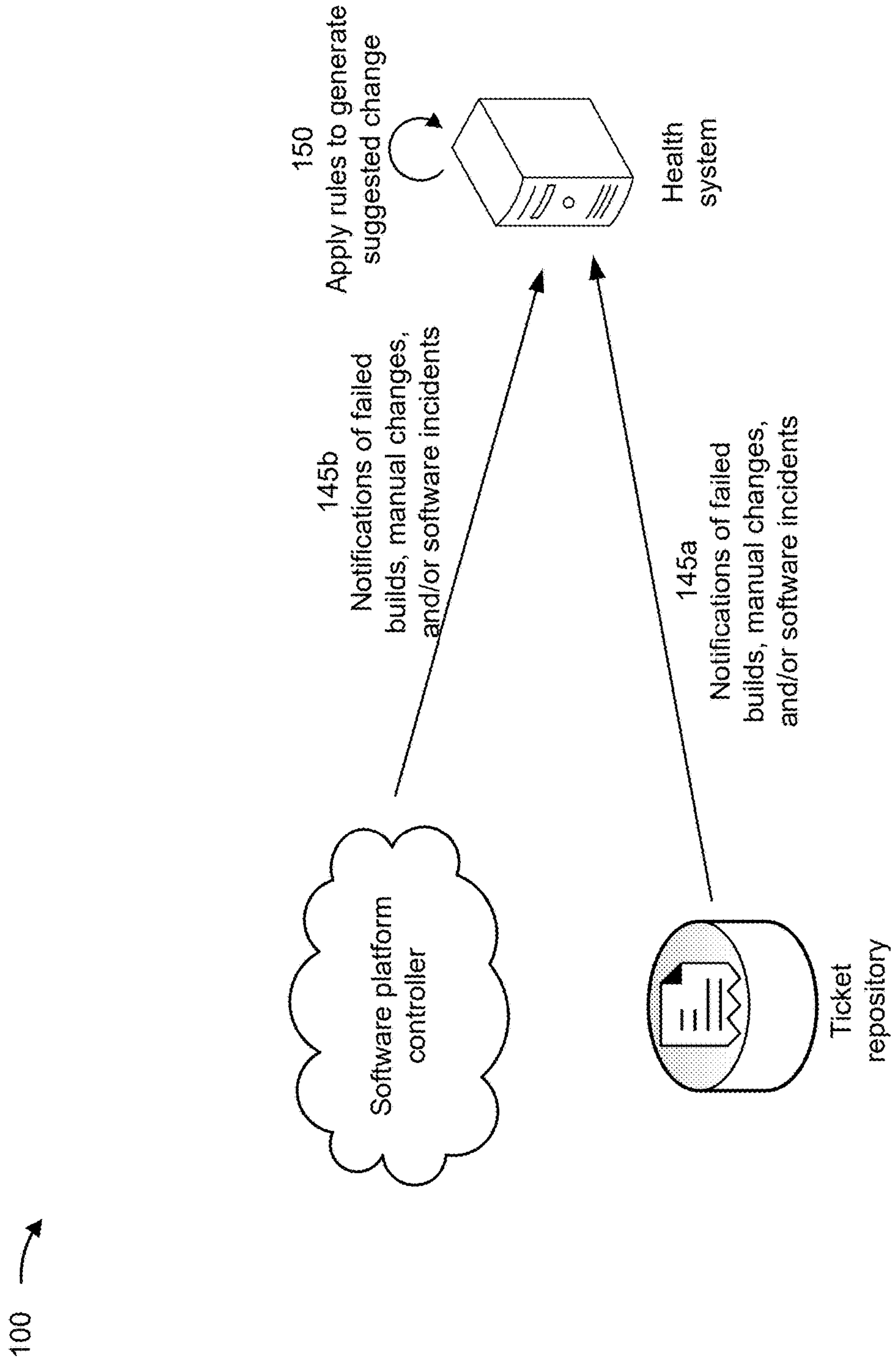

As shown in FIG. 1D and by reference number 145*a*, the ticket repository may transmit, and the health system may receive, a set of notifications associated with failed builds, manual changes, software incidents, or a combination thereof. The set of notifications may include a set of tickets, where each ticket is a data structure that represents a problem with the software platform. In another example, the set of notifications may include a set of extracts from log files (e.g., one or more log files), where each extract is associated with a problem in the software platform.

In some implementations, the health system may transmit, and the ticket repository may receive, a request for the set of notifications. For example, the request may include an HTTP request and/or an API call, among other examples. The request may include (e.g., in a header and/or as an argument) an indication of the software platform (e.g., an alphanumeric identifier of the software platform). Accordingly, the ticket repository may transmit the set of notifications in response to the request. The health system may transmit the request according to a schedule (e.g., once per hour or once per day, among other examples) and/or in response to a command to transmit the request. For example, the administrator device (not shown in FIG. 1D) may transmit, and the health system may receive, the command, such that the health system transmits the request in response to the command.

Additionally, or alternatively, the health system may subscribe to notification updates from the ticket repository. Accordingly, the ticket repository may transmit new notifications (and/or updated notifications) according to a schedule (e.g., once per hour or once per day, among other examples) and/or as available (e.g., shortly after a new notification is received or an existing notification is updated).

Additionally, or alternatively, as shown by reference number 145*b*, the software platform controller may transmit, and the health system may receive, the set of notifications. In some implementations, the health system may transmit, and the software platform controller may receive, a request for the set of notifications. For example, the request may include an HTTP request and/or an API call, among other examples. The request may include (e.g., in a header and/or as an argument) an indication of the software platform. Accordingly, the software platform controller may transmit the set of notifications in response to the request. The health system may transmit the request according to a schedule (e.g., once per hour or once per day, among other examples) and/or in response to a command to transmit the request. For example, the administrator device (not shown in FIG. 1D) may transmit, and the health system may receive, the command, such that the health system transmits the request in response to the command.

Additionally, or alternatively, the health system may subscribe to notification updates from the software platform controller. Accordingly, the software platform controller may transmit new notifications (and/or updated notifications) according to a schedule (e.g., once per hour or once per day, among other examples) and/or as available (e.g., shortly after a new notification is received or an existing notification is updated).

As shown by reference number 150, the health system may apply a set of rules to the set of notifications to generate a suggested change to the software platform. For example, the set of rules may include regular expressions ("regexes") that identify patterns within the set of notifications and correlate identified patterns to suggested changes. Additionally, or alternatively, the set of rules may include an ML model (e.g., similarly as described above in connection with FIG. 1C).

The suggested change may indicate a monitoring software to discontinue, an additional monitoring software to deploy, a security setting to modify, and/or a software update to perform, among other examples. Additionally, or alternatively, the suggested change may indicate a remediation for an incident associated with a notification in the set of notifications.

In some implementations, the health system may additionally, or alternatively, determine a possible solution to the incident (associated with the notification in the set of notifications) separately from the suggested change. For example, the health system may apply a rule (e.g., at least one rule), separate from the set of rules used to determine the suggested change, to the notification (in the set of notifications) in order to determine the possible solution. The rule may include a regex that maps the notification to the possible solution (e.g., using a tabular data structure or another type of relational data structure that associates incidents with possible solutions. In one example, the health system may apply NLP to a set of pull requests associated with the software platform in order to determine the rule using the NLP. In some implementations, the NLP includes a machine learning model trained using resolved incidents from other software platforms. For example, the NLP may be performed on an ML host (e.g., similarly as described for the clustering model in connection with FIG. 1B and the ML model in connection with FIG. 1C). The possible solution may indicate a cloud storage to refresh, a cloud application to update (e.g., with a security patch or another type of update), a security setting to modify, and/or a user permission to modify, among other examples.

Figure 1E:
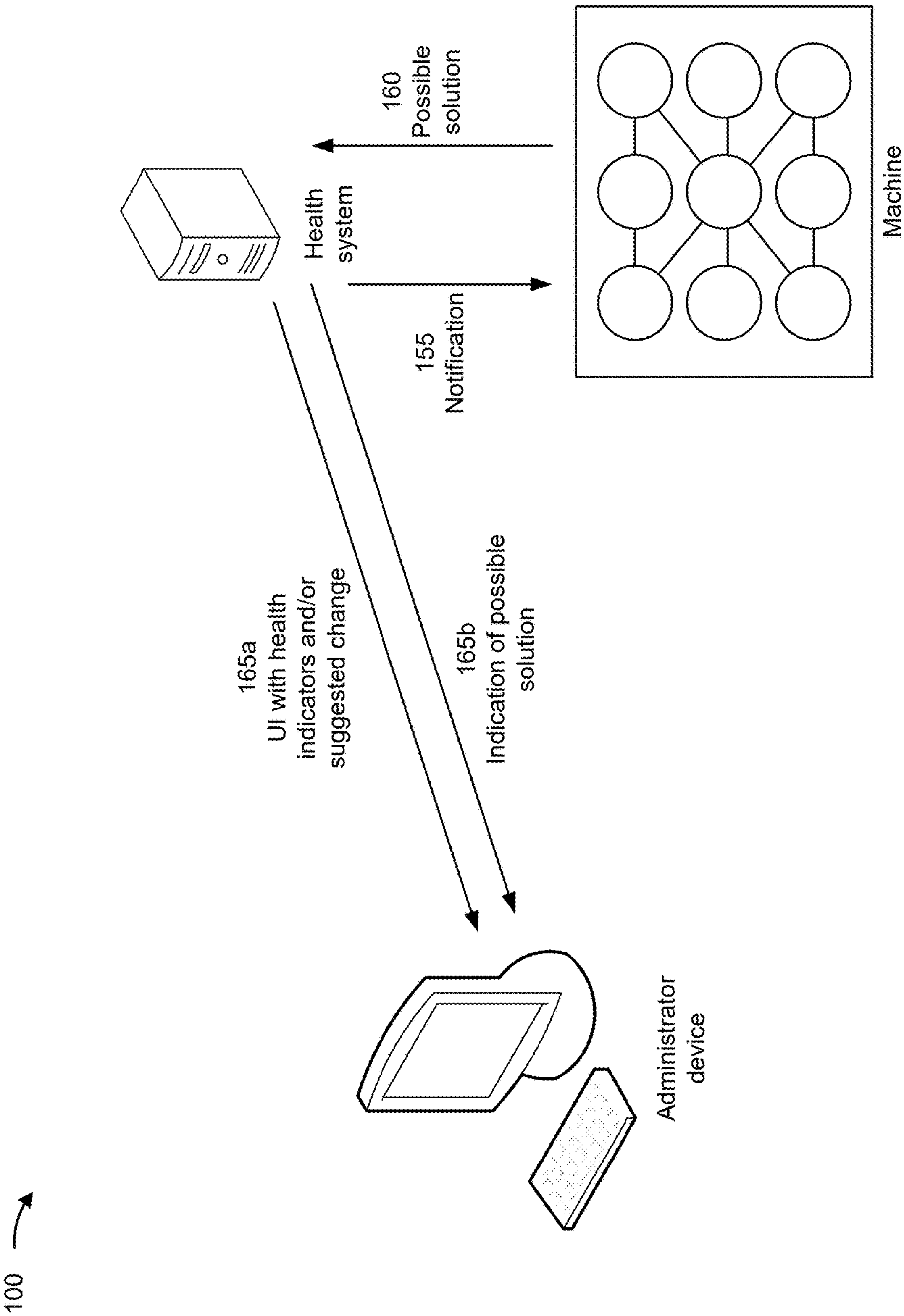

Additionally, or alternatively, and as shown in FIG. 1E and by reference number 155, the health system may provide the notification to an ML model. For example, the health system may transmit, and the ML host may receive, a request including the notification. The ML model may be trained (e.g., by the ML host and/or a device at least partially separate from the ML host) using resolved incidents associated with software platforms labeled as well-established (e.g., for supervised learning). Additionally, or alternatively, the ML model may be trained using an unlabeled set of notifications from other software platforms (e.g., for deep learning). Accordingly, the ML model may suggest the possible solution to the notification.

In some implementations, the ML model may include a regression algorithm (e.g., linear regression or logistic regression), which may include a regularized regression algorithm (e.g., Lasso regression, Ridge regression, or Elastic-Net regression). Additionally, or alternatively, the ML model may include a decision tree algorithm, which may include a tree ensemble algorithm (e.g., generated using bagging and/or boosting), a random forest algorithm, or a boosted trees algorithm. A model parameter may include an attribute of a model that is learned from data input into the model (e.g., resolved incidents associated with software platforms labeled as well-established). For example, for a regression algorithm, a model parameter may include a regression coefficient (e.g., a weight). For a decision tree algorithm, a model parameter may include a decision tree split location, as an example.

Additionally, the ML host (and/or a device at least partially separate from the ML host) may use one or more hyperparameter sets to tune the ML model. A hyperparameter may include a structural parameter that controls execution of a machine learning algorithm by the cloud management device, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the model. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

Other examples may use different types of models, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

The ML model described in connection with FIG. 1E may be the same model (or at least included in a same model ensemble) as the ML model described in connection with FIG. 1C. Alternatively, the ML model described in connection with FIG. 1E may be separate from the ML model described in connection with FIG. 1C. In some implementations, a same ML host may provide the ML model described in connection with FIG. 1E as provides the ML model described in connection with FIG. 1C. Alternatively, the ML model described in connection with FIG. 1E may be provided by a different ML host as the ML model described in connection with FIG. 1C.

As shown by reference number 160, the health system may receive an indication of the possible solution from the ML model. The health system may output instructions for a UI that includes the first health indicator, the second health indicator, the third health indicator, and the suggested change. For example, as shown by reference number 165*a*, the health system may transmit, and the administrator device may receive, the instructions for the UI. The UI may be as described in connection with FIG. 2.

In some implementations, the health system may further generate a prediction, associated with the software platform, based on the set of property indications and the log file. For example, the prediction may be received from a machine learning model trained using time series associated with other software platforms. For example, the prediction may be generated by an ML host (e.g., similarly as described for the clustering model in connection with FIG. 1B and the ML models in connection with FIGS. 1C and 1E). The prediction may indicate expected downtime in the future or an incident that is expected to occur. The UI may further include the prediction. Additionally, or alternatively, the suggested change may be further based on the prediction.

Although the example 100 is described in connection with the UI including the suggested change, other examples may additionally or alternatively include the health system transmitting an indication of the suggested change using a communication channel selected based on a user preference. For example, the administrator device may transmit, and the health system may receive, an indication of the user preference (e.g., a preferred email address, a preferred mobile number, and/or a preferred Slack® channel, among other examples). Accordingly, the health system may store the user preference and transmit the indication of the suggested change based on the user preference (e.g., sending an email message to the preferred email address, sending a text message to the preferred mobile number, and/or sending a chat message to the preferred Slack channel, among other examples).

Additionally, or alternatively, as shown by reference number 165*b*, the health system may transmit, and the administrator device may receive, an indication of the possible solution. In some implementations, as described in connection with FIG. 2, the possible solution may be included in the UI. Additionally, or alternatively, the health system may transmit an indication of the possible solution using a communication channel selected based on a user preference. For example, the health system may store the user preference and transmit the indication of the possible solution based on the user preference (e.g., sending an email message to a preferred email address, sending a text message to a preferred mobile number, and/or sending a chat message to a preferred Slack channel, among other examples). The user preference indicating a communication channel for possible solutions may be the same as, or different than, the user preference indicating a communication channel for suggested changes.

Figure 1F:
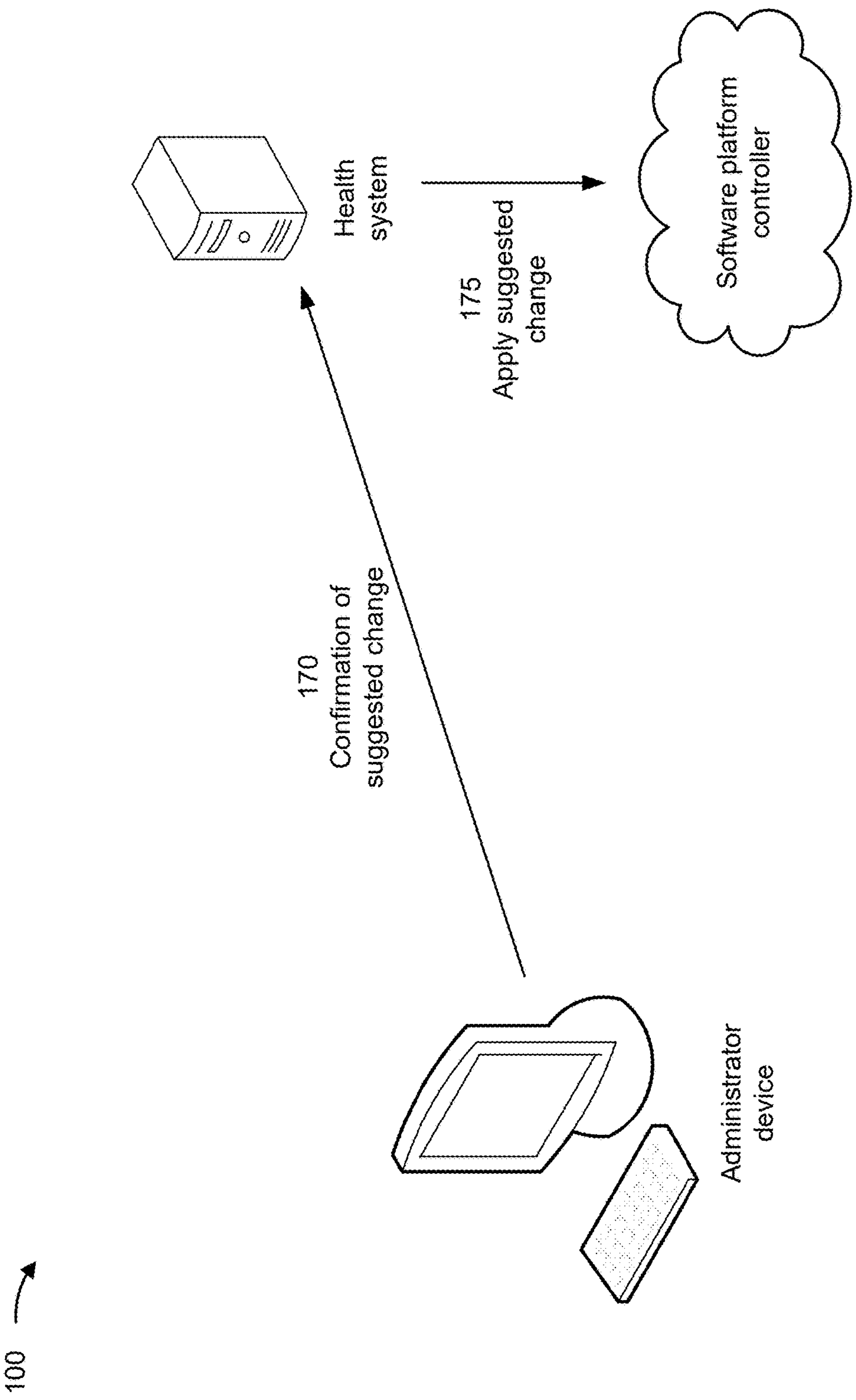

As shown in FIG. 1F, the administrator device may confirm suggested changes from the health system. For example, the administrator device may transmit, and the health system may receive, a confirmation of the suggested change, as shown by reference number 170. In some implementations, a user of the administrator device may interact with a UI element (e.g., a button, as described in connection with FIG. 2) to trigger the administrator device to transmit the confirmation. Accordingly, as shown by reference number 175, the health system may apply the suggested change in response to the confirmation. For example, the health system may transmit, and the software platform controller may receive, a command to apply the suggested change.

By proactively modifying the software platform, the health system may resolve a problem in one portion of the software platform before the problem causes additional trickle-down problems with other portions of the software platform. As a result, power and processing resources are conserved that otherwise would have been expended on remediation. Additionally, users of the software platform experienced reduced latency due to reduced downtime of the software platform.

Figure 1G:
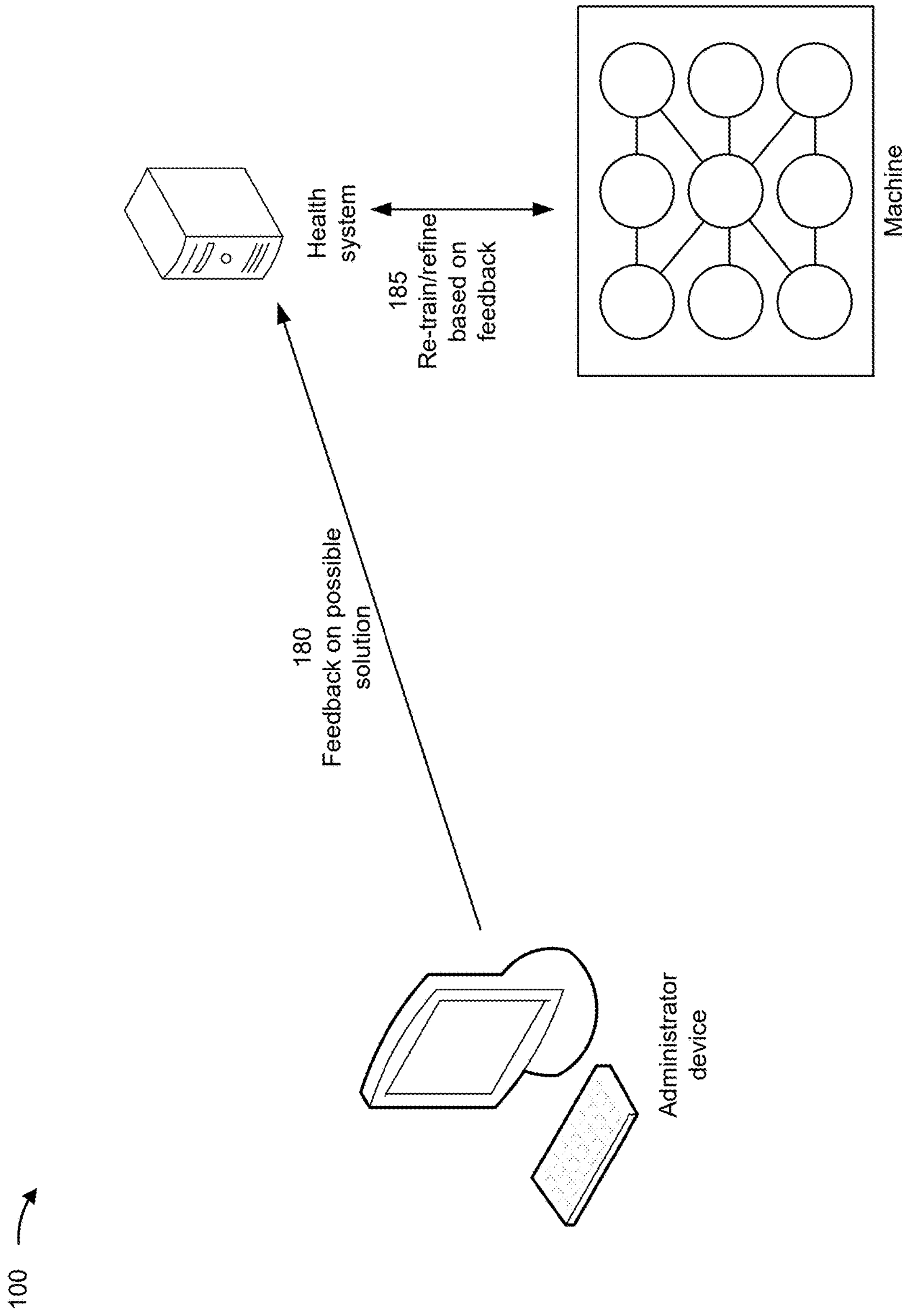

Additionally, or alternatively, as shown in FIG. 1G, the health system may improve machine learning based on feedback. For example, the administrator device may transmit, and the health system may receive, feedback associated with the possible solution, as shown by reference number 180. In some implementations, a user of the administrator device may interact with a UI element (e.g., a button, as described in connection with FIG. 2) to trigger the administrator device to transmit the feedback. Accordingly, as shown by reference number 185, the health system may update the ML model (or multiple ML models, as described in connection with the example 100) based on the feedback. For example, the health system may perform (or request that the ML host perform) re-training of the ML model using the feedback. Therefore, the feedback may be added to a training data set, and the ML model may be re-trained on the updated training data set. Additionally, or alternatively, the health system may perform (or request that the ML host perform) refinement of the ML model using the feedback. Therefore, the feedback may be used to modify a portion of the ML model (e.g., adjusting activation weights in a neural network, among other examples).

Therefore, the health system may use the updated machine learning model to generate an additional suggested change to the software platform based on the set of notifications. Additionally, the health system may output instructions (e.g., to the administrator device) to update the UI with the additional suggested change.

As indicated above, FIGS. 1A-1G are provided as an example. Other examples may differ from what is described with regard to FIGS. 1A-1G. For example, the clustering model and/or the ML model may be hosted locally at the health system rather than at least partially externally at the ML host. Additionally, or alternatively, the clustering model and/or the ML model may be trained locally at the health system rather than at least partially externally at the ML host.

FIG. 2 is a diagram of an example UI 200 associated with health of a software platform. The example UI 200 may be shown by an administrator device (e.g., based on instructions from a health system). These devices are described in more detail in connection with FIGS. 3 and 4.

As shown in FIG. 2, the example UI 200 may indicate a plurality of ratings 205. The plurality of ratings 205 may be associated with a plurality of categories. Accordingly, the plurality of ratings 205 may represent a multi-dimensional health indicator (or a plurality of health indicators) associated with a software platform.

As further shown in FIG. 2, the example UI 200 may indicate a suggested change 210. In some implementations, the example UI 200 may further include a first button 215*a* that triggers application of the suggested change 210 and a second button 215*b* that triggers rejection of the suggested change 210.

The health system may further have transmitted an indication of a proposed solution separately from the example UI 200. Accordingly, the example UI 200 may include a set of rating elements 220 to gather feedback about the proposed solution. The set of rating elements 220 may include different ratings (e.g., shown as buttons 225*a*, 225*b*, 225*c*, and 225*d*). Therefore, a user may provide feedback associated with the proposed solution, which the health system may use to update an ML model (e.g., as described in connection with FIG. 1G).

As indicated above, FIG. 2 is provided as an example. Other examples may differ from what is described with regard to FIG. 2. In some implementations, other examples may include a set of rating elements associated with the suggested change 210 in addition to, or in lieu of, the set of rating elements 220 associated with the proposed solution. Accordingly, a user may provide feedback associated with the suggested change 210, which the health system may use to update an ML model. Additionally, or alternatively, other examples may indicate the proposed solution directly in the example UI, similar to the suggested change 210.

Figure 3:
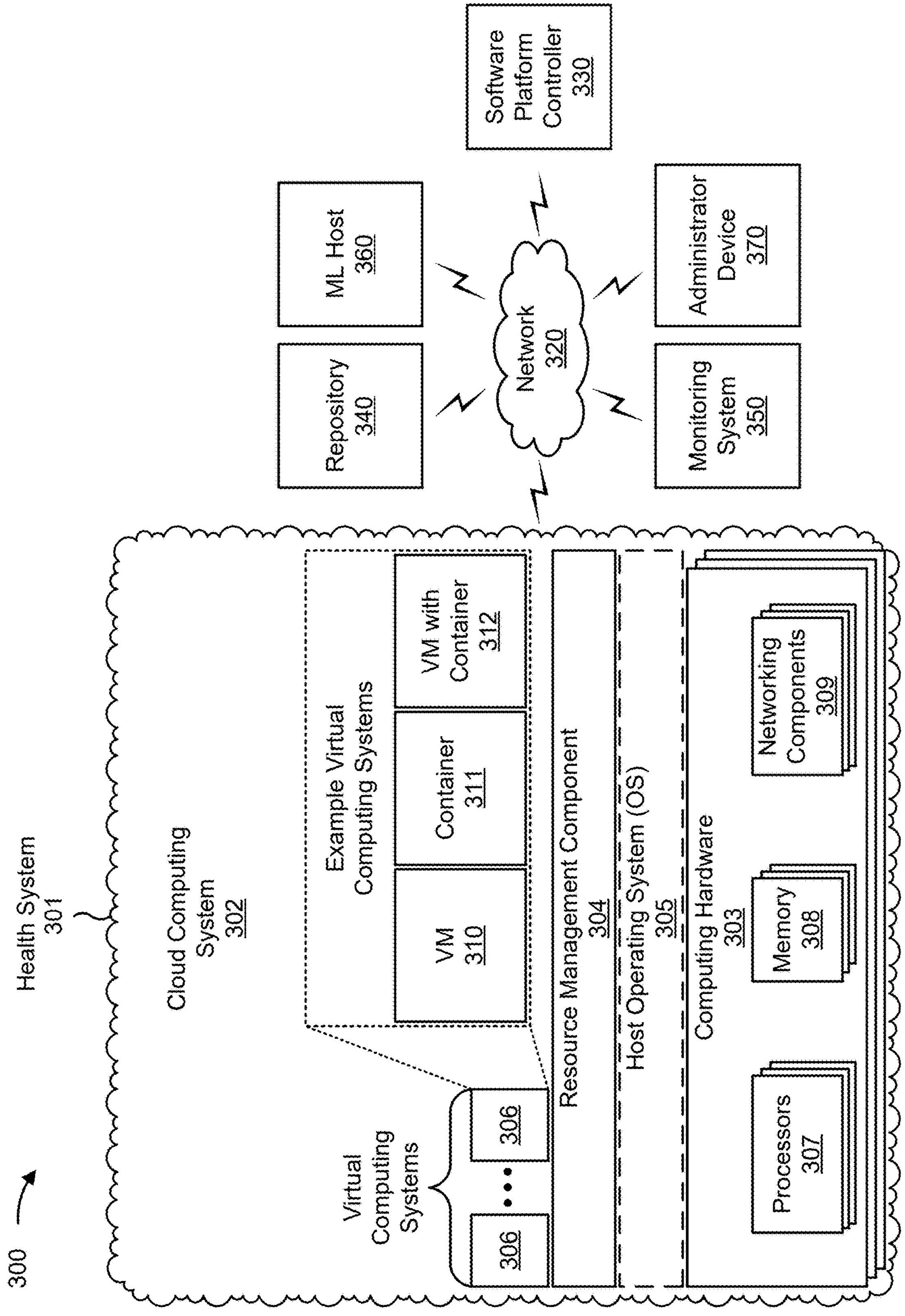
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a health system 301, which may include one or more elements of and/or may execute within a cloud computing system 302. The cloud computing system 302 may include one or more elements 303-312, as described in more detail below. As further shown in FIG. 3, environment 300 may include a network 320, a software platform controller 330, a repository 340, a monitoring system 350, an ML host 360, and/or an administrator device 370. Devices and/or elements of environment 300 may interconnect via wired connections and/or wireless connections.

The cloud computing system 302 may include computing hardware 303, a resource management component 304, a host OS 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the health system 301 may include one or more elements 303-312 of the cloud computing system 302, may execute within the cloud computing system 302, and/or may be hosted within the cloud computing system 302, in some implementations, the health system 301 may not be cloud-based (e.g., may be implemented outside of a cloud computing system) or may be partially cloud-based. For example, the health system 301 may include one or more devices that are not part of the cloud computing system 302, such as device 400 of FIG. 4, which may include a stand-alone server or another type of computing device. The health system 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The software platform controller 330 may include one or more devices capable of receiving, generating, storing, processing, providing, and/or routing information associated with a software platform managed by the software platform controller 330, as described elsewhere herein. The software platform controller 330 may include a communication device and/or a computing device. For example, the software platform controller 330 may include a server, such as an application server, a client server, a web server, a database server, a host server, a proxy server, a virtual server (e.g., executing on computing hardware), or a server in a cloud computing system. In some implementations, the software platform controller 330 may include computing hardware used in a cloud computing environment. The software platform controller 330 may communicate with one or more other devices of environment 300, as described elsewhere herein.

The repository 340 may include one or more devices capable of receiving, generating, storing, processing, and/or providing information associated with documentation, logs, and/or tickets, as described elsewhere herein. The repository 340 may include a communication device and/or a computing device. For example, the repository 340 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The repository 340 may communicate with one or more other devices of environment 300, as described elsewhere herein.

The monitoring system 350 may include one or more devices capable of receiving, generating, storing, processing, providing, and/or routing information associated with a software platform monitored by the monitoring system 350, as described elsewhere herein. The monitoring system 350 may include a communication device and/or a computing device. For example, the monitoring system 350 may include a server, such as an application server, a client server, a web server, a database server, a host server, a proxy server, a virtual server (e.g., executing on computing hardware), or a server in a cloud computing system. In some implementations, the monitoring system 350 may include computing hardware used in a cloud computing environment. The monitoring system 350 may communicate with one or more other devices of environment 300, as described elsewhere herein.

The ML host 360 may include one or more devices capable of receiving, generating, storing, processing, and/or providing information associated with machine learning models, as described elsewhere herein. The ML host 360 may include a communication device and/or a computing device. For example, the ML host 360 may include a server, a database server, an application server, a client server, a web server, a host server, a proxy server, a virtual server (e.g., executing on computing hardware), a server in a cloud computing system, a device that includes computing hardware used in a cloud computing environment, or a similar type of device. The ML host 360 may communicate with one or more other devices of environment 300, as described elsewhere herein.

The administrator device 370 may include one or more devices capable of receiving, generating, storing, processing, and/or providing information associated with software platforms, as described elsewhere herein. The administrator device 370 may include a communication device and/or a computing device. For example, the administrator device 370 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The administrator device 370 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
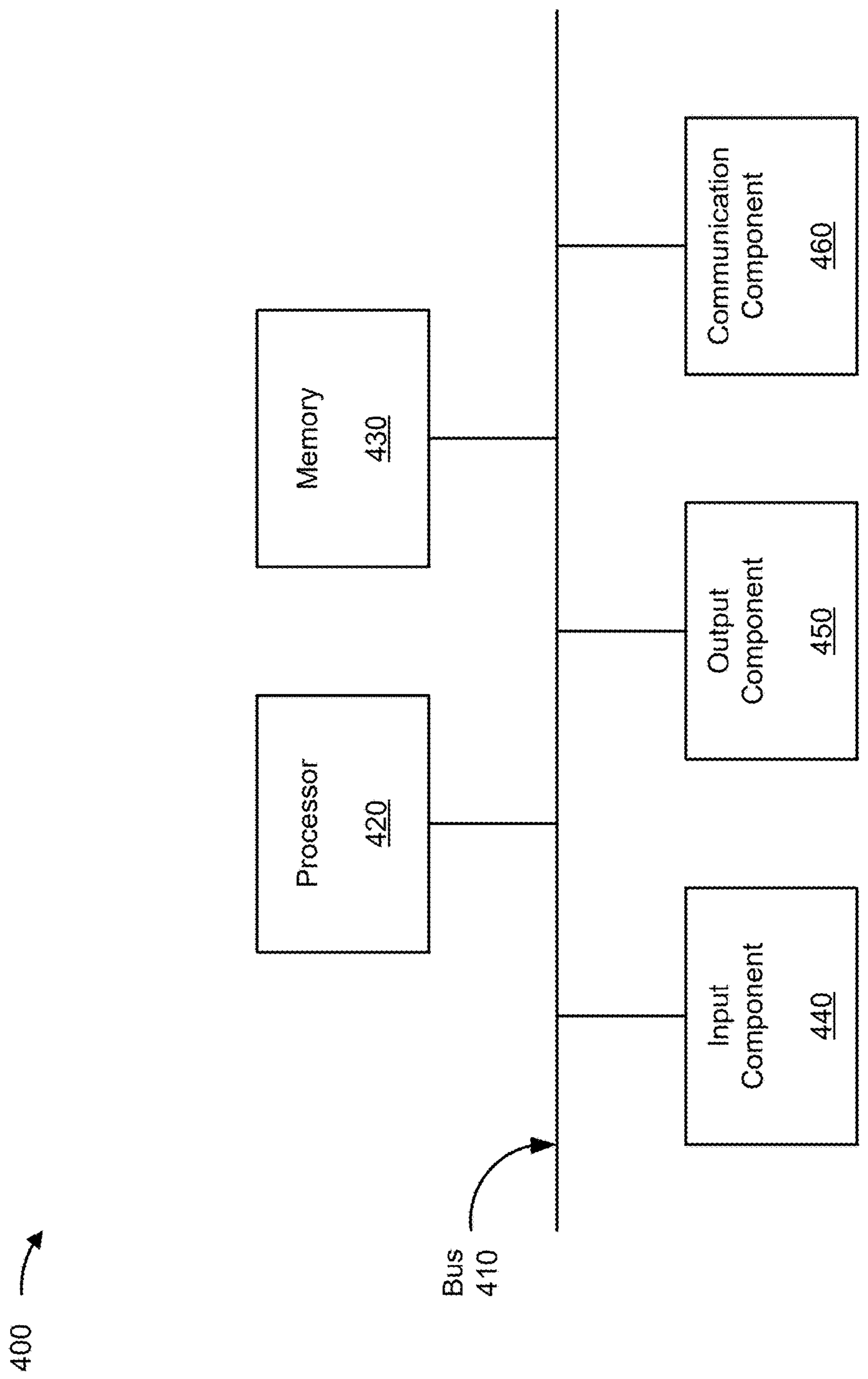
FIG. 4 is a diagram of example components of one or more devices of FIG. 3, in accordance with some embodiments of the present disclosure.

FIG. 4 is a diagram of example components of a device 400 associated with software platform health analysis. The device 400 may correspond to a software platform controller 330, a repository 340, a monitoring system 350, an ML host 360, and/or an administrator device 370. In some implementations, a software platform controller 330, a repository 340, a monitoring system 350, an ML host 360, and/or an administrator device 370 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
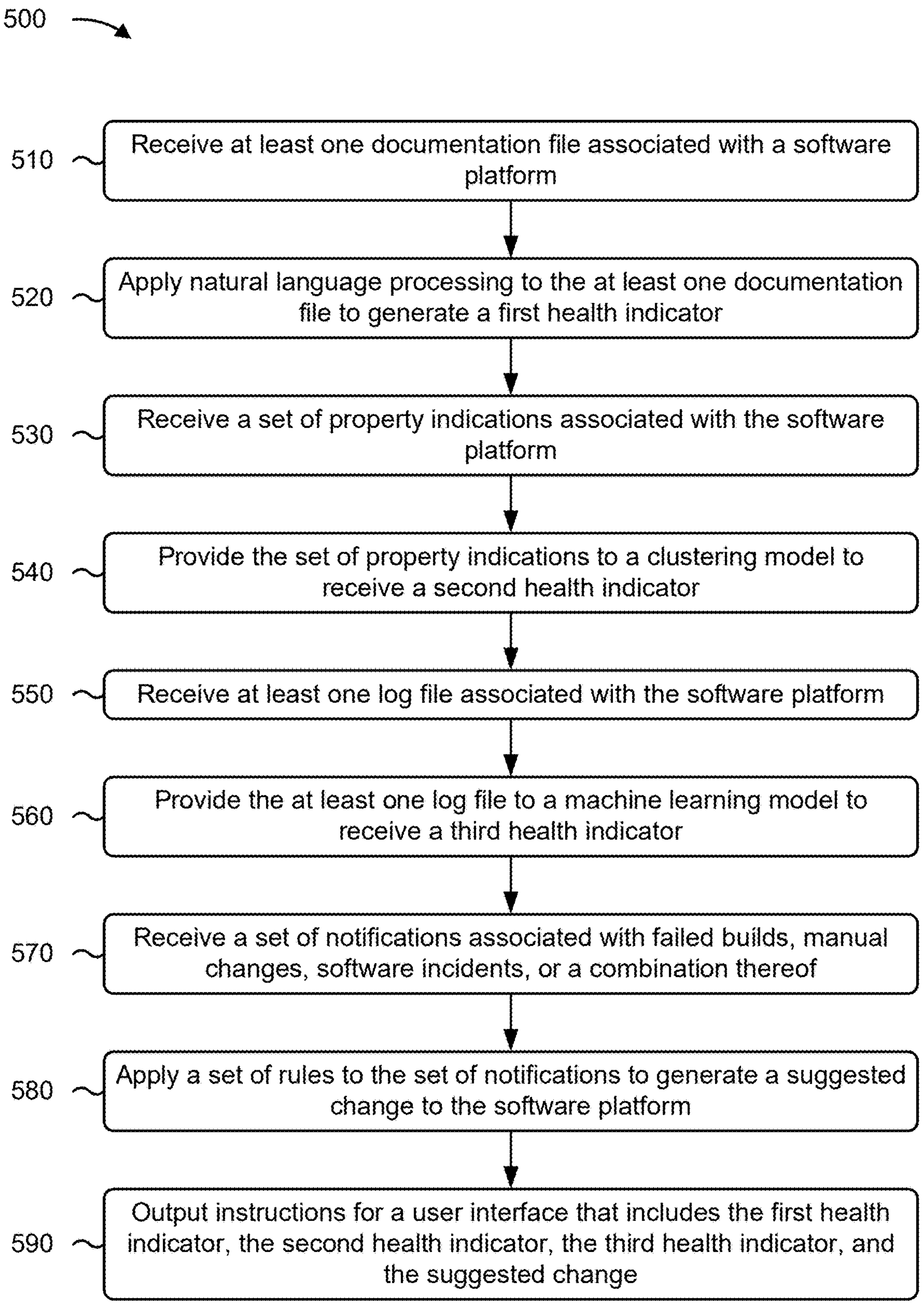
FIG. 5 is a flowchart of an example process relating to software platform health analysis, in accordance with some embodiments of the present disclosure.

FIG. 5 is a flowchart of an example process 500 associated with software platform health analysis. In some implementations, one or more process blocks of FIG. 5 may be performed by a health system 301. In some implementations, one or more process blocks of FIG. 5 may be performed by another device or a group of devices separate from or including the health system 301, such as a software platform controller 330, a repository 340, a monitoring system 350, an ML host 360, and/or an administrator device 370. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving at least one documentation file associated with a software platform (block 510). For example, the health system 301 (e.g., using processor 420, memory 430, input component 440, and/or communication component 460) may receive at least one documentation file associated with a software platform, as described above in connection with reference number 105*a* and/or reference number 105*b* of FIG. 1A. As an example, the health system 301 may receive the at least one documentation file from a document repository and/or a software platform controller associated with the software platform.

As further shown in FIG. 5, process 500 may include applying natural language processing to the at least one documentation file to generate a first health indicator (block 520). For example, the health system 301 (e.g., using processor 420 and/or memory 430) may apply natural language processing to the at least one documentation file to generate a first health indicator, as described above in connection with reference number 110 of FIG. 1A. As an example, the health system 301 may apply natural language processing to determine a score (whether qualitative and/or quantitative) associated with the at least one documentation file (e.g., a score reflecting readability or understandability). In some implementations, the natural language processing includes a machine learning model trained using documentation associated with software platforms labeled as well-established.

As further shown in FIG. 5, process 500 may include receiving a set of property indications associated with the software platform (block 530). For example, the health system 301 (e.g., using processor 420, memory 430, input component 440, and/or communication component 460) may receive a set of property indications associated with the software platform, as described above in connection with reference number 115*a* and/or reference number 115*b* of FIG. 1B. As an example, the health system 301 may receive the set of property indications from a monitoring system and/or the software platform controller associated with the software platform.

As further shown in FIG. 5, process 500 may include providing the set of property indications to a clustering model to receive a second health indicator (block 540). For example, the health system 301 (e.g., using processor 420, memory 430, and/or communication component 460) may provide the set of property indications to a clustering model to receive a second health indicator, as described above in connection with reference numbers 120 and 125 of FIG. 1B. As an example, the clustering model may be configured to cluster the set of property indications, and therefore, based on which property indications are in a same cluster as property indications associated with well-managed software platforms and which property indications are in different clusters, the clustering model may determine which property indications, in the set of property indications, ought to be changed. The second health indicator may be based on which property indications, in the set of property indications, ought to be changed.

As further shown in FIG. 5, process 500 may include receiving at least one log file associated with the software platform (block 550). For example, the health system 301 (e.g., using processor 420, memory 430, input component 440, and/or communication component 460) may receive at least one log file associated with the software platform, as described above in connection with reference number 130*a* and/or reference number 130*b* of FIG. 1C. As an example, the health system 301 may receive the at least one log file from a log repository and/or the software platform controller associated with the software platform.

As further shown in FIG. 5, process 500 may include providing the at least one log file to a machine learning model to receive a third health indicator (block 560). For example, the health system 301 (e.g., using processor 420, memory 430, and/or communication component 460) may provide the at least one log file to a machine learning model to receive a third health indicator, as described above in connection with reference numbers 135 and 140 of FIG. 1C. As an example, the machine learning model may be configured to compare a monitoring setup associated with the at least one log file to monitoring setups of other software platforms and therefore may determine whether any monitoring software deployed for the software platform ought to be discontinued and/or whether any monitoring software currently unused ought to be deployed. The third health indicator may be based on which monitoring software ought to be discontinued and/or ought to be deployed.

As further shown in FIG. 5, process 500 may include receiving a set of notifications associated with failed builds, manual changes, software incidents, or a combination thereof (block 570). For example, the health system 301 (e.g., using processor 420, memory 430, input component 440, and/or communication component 460) may receive a set of notifications associated with failed builds, manual changes, software incidents, or a combination thereof, as described above in connection with reference number 145*a* and/or reference number 145*b* of FIG. 1D. As an example, the health system 301 may receive the set of notifications from a ticket repository and/or the software platform controller associated with the software platform.

As further shown in FIG. 5, process 500 may include applying a set of rules to the set of notifications to generate a suggested change to the software platform (block 580). For example, the health system 301 (e.g., using processor 420 and/or memory 430) may apply a set of rules to the set of notifications to generate a suggested change to the software platform, as described above in connection with reference number 150 of FIG. 1D. As an example, the set of rules may include regular expressions that identify patterns within the set of notifications and correlate identified patterns to suggested changes. Additionally, or alternatively, the set of rules may include a machine learning model.

As further shown in FIG. 5, process 500 may include outputting instructions for a UI that includes the first health indicator, the second health indicator, the third health indicator, and the suggested change (block 590). For example, the health system 301 (e.g., using processor 420, memory 430, and/or output component 450) may output instructions for a UI that includes the first health indicator, the second health indicator, the third health indicator, and the suggested change, as described above in connection with reference number 165*a* of FIG. 1E. As an example, the UI may be as described in connection with FIG. 2.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1G and/or FIG. 2. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for analyzing software platform health, the system comprising:
- one or more memories; and
- one or more processors, communicatively coupled to the one or more memories, configured to:
  - receive at least one documentation file associated with a software platform;
  - apply natural language processing to the at least one documentation file to generate a first health indicator that reflects readability or understandability associated with the documentation file;
  - receive a set of property indications associated with the software platform;
  - provide the set of property indications to a clustering model to receive a second health indicator, wherein the clustering model is trained using property indications associated with software platforms that are labeled as well-established;
  - receive at least one log file associated with the software platform;
  - provide the at least one log file to a machine learning model to receive a third health indicator;
  - receive a set of notifications associated with failed builds, manual changes, software incidents, or a combination thereof;
  - apply a set of rules to the set of notifications to generate a suggested change to the software platform; and
  - output instructions for a user interface (UI) that includes the first health indicator, the second health indicator, the third health indicator, and the suggested change.

2. The system of claim 1, wherein the at least one documentation file includes a webpage, a portable document format file, or a word processor file.

3. The system of claim 1, wherein the one or more processors are configured to:
- generate synthetic monitoring setups using a generative adversarial network,
  - wherein the machine learning model is trained using the synthetic monitoring setups.

4. The system of claim 1, wherein the one or more processors are configured to:
- transmit an indication of the suggested change using a communication channel selected based on a user preference.

5. The system of claim 1, wherein the one or more processors are configured to:
- generate a prediction, associated with the software platform, based on the set of property indications and the at least one log file,
  - wherein the UI further includes the prediction.

6. The system of claim 5, wherein the suggested change is further based on the prediction.

7. The system of claim 1, wherein the set of property indications comprises:
- version numbers associated with software applications,
- firewall settings associated with the software platform,
- API settings associated with the software platform, or
- security groups associated with the software platform.

8. A method of analyzing software platform health, comprising:
- receiving, at a health system, a set of property indications associated with a software platform;
- providing, by the health system, the set of property indications to a clustering model to receive a health indicator that reflects readability or understandability associated with the software platform, wherein the clustering model is trained using property indications associated with software platforms that are labeled as well-established;
- receiving, at the health system, a set of notifications associated with failed builds, manual changes, software incidents, or a combination thereof;
- applying, by the health system, a set of rules to the set of notifications to generate a suggested change to the software platform; and
- outputting, from the health system, instructions for a user interface (UI) that includes the health indicator and the suggested change.

9. The method of claim 8, wherein the health indicator includes a plurality of ratings corresponding to a plurality of categories.

10. The method of claim 8, wherein the suggested change indicates a remediation for an incident associated with a notification in the set of notifications.

11. The method of claim 8, wherein the suggested change indicates an additional monitoring software to deploy.

12. The method of claim 8, further comprising:
- receiving, at the health system, a confirmation of the suggested change; and
- applying, by the health system, the suggested change in response to the confirmation.

13. The method of claim 8, wherein outputting the instructions for the UI comprises:
- transmitting the instructions for the UI to an administrator device.

14. A non-transitory computer-readable medium storing a set of instructions for analyzing software platform health, the set of instructions comprising:
- one or more instructions that, when executed by one or more processors of a device, cause the device to:

receive, at a health system, a set of property indications associated with a software platform;

receive, in response to providing the set of property indications to a clustering model, a health indicator that reflects readability or understandability associated with the software platform, wherein the clustering model is trained using property indications associated with software platforms that are labeled as well-established;

receive a set of notifications associated with failed builds, manual changes, software incidents, or a combination thereof, for the software platform;

generate, using a machine learning model, a suggested change to the software platform based on the set of notifications;

output instructions for a user interface (UI) that includes the health indicator and the suggested change;

determine a possible solution to an incident associated with a notification in the set of notifications;

transmit an indication of the possible solution using a communication channel selected based on a user preference;

receive feedback associated with the possible solution;

update the machine learning model based on the feedback;

generate, using the updated machine learning model, an additional suggested change to the software platform based on the set of notifications; and output instructions to update the UI with the additional suggested change.

15. The non-transitory computer-readable medium of claim 14, wherein the one or more instructions, to update the machine learning model, cause the device to:

re-train the machine learning model using the feedback.

16. The non-transitory computer-readable medium of claim 14, wherein the one or more instructions, to update the machine learning model, cause the device to:

refine the machine learning model using the feedback.

17. The non-transitory computer-readable medium of claim 14, wherein the one or more instructions, to determine the possible solution, cause the device to:

apply natural language processing to a set of pull requests associated with the software platform;

determine at least one rule using the natural language processing; and apply the at least one rule to the notification, in the set of notifications, to determine the possible solution.

18. The non-transitory computer-readable medium of claim 14, wherein the one or more instructions, to determine the possible solution, cause the device to:

apply an additional machine learning model to a set of pull requests associated with the software platform; and determine the possible solution based on output from the additional machine learning model.

19. The non-transitory computer-readable medium of claim 14, wherein the one or more instructions, when executed by the one or more processors, cause the device to:

generate synthetic monitoring setups using a generative adversarial network, wherein the suggested change is further based on the synthetic monitoring setups.

20. The non-transitory computer-readable medium of claim 14, wherein the one or more instructions, to output the instructions for the UI, cause the device to:

transmit the instructions for the UI to an administrator device.

* * * * *